United States Patent
Batta et al.

(10) Patent No.: US 10,033,589 B1
(45) Date of Patent: Jul. 24, 2018

(54) MANAGEMENT OF SERVICES TO SUBSCRIBER GROUPS IN A DISTRIBUTED SERVICE PLANE ENVIRONMENT

(71) Applicant: Juniper Networks, Inc., Sunnyvale, CA (US)

(72) Inventors: Sarvesh K. Batta, Bangalore (IN); Venkatesh Badakere, Bangalore (IN); Prasad Chigurupati, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 121 days.

(21) Appl. No.: 14/871,333

(22) Filed: Sep. 30, 2015

(51) Int. Cl.
*H04L 12/24* (2006.01)
*H04L 12/911* (2013.01)

(52) U.S. Cl.
CPC .......... *H04L 41/0893* (2013.01); *H04L 47/78* (2013.01)

(58) Field of Classification Search
CPC . H04L 47/20; H04L 63/0236; H04L 12/1407; H04L 12/569; H04L 63/0227; H04L 63/104; H04L 41/0893
See application file for complete search history.

(56) References Cited

U.S. PATENT DOCUMENTS

| | | |
|---|---|---|
| 8,339,959 B1 | 12/2012 | Moisand et al. |
| 8,948,174 B2 | 2/2015 | Szyszko et al. |
| 2008/0044181 A1 | 2/2008 | Sindhu |
| 2011/0167471 A1* | 7/2011 | Riley ............... H04W 4/00 726/1 |
| 2014/0092899 A1* | 4/2014 | Krishna ............ H04L 61/2517 370/389 |
| 2015/0063166 A1* | 3/2015 | Sif ................. G06F 9/45558 370/254 |

FOREIGN PATENT DOCUMENTS

WO   2013184846 A1   12/2013

OTHER PUBLICATIONS

"3GPP TS 23.203—Policy and Charging Control Architecture (Release 13)," Version 13.4.0, 3rd Generation Partnership Project, Technical Specification Group Services and System Aspects, Jun. 2015, 235 pp.
"3GPP TS 29.212—Policy and Charging Control (PCC), Reference Points (Release 13)," Version 13.2.0, 3rd Generation Partnership Project, Technical Specification Group Core Network and Terminals, Jun. 2015, 228 pp.

* cited by examiner

*Primary Examiner* — Marsha D. Banks Harold
*Assistant Examiner* — Elton Williams
(74) *Attorney, Agent, or Firm* — Shumaker & Sieffert, P.A.

(57) ABSTRACT

In general, techniques are described for managing group policies in a network. In some examples, a policy enforcement device comprising a plurality of service planes, each having one or more processors operably coupled to a memory, receives a policy enforcement request that includes data identifying a subscriber from a policy control server for a network. The plurality of service planes are further configured to assign, in response to determining that the subscriber is a member of a subscriber group that includes a plurality of subscribers, the subscriber to a selected service plane of the plurality of service planes. The selected service plane applies a group policy for the subscriber group to subscriber data traffic associated with the subscriber.

12 Claims, 4 Drawing Sheets

MANAGEMENT OF SERVICES TO SUBSCRIBER GROUPS IN A DISTRIBUTED SERVICE PLANE ENVIRONMENT

TECHNICAL FIELD

The disclosure relates to computer networks and, more specifically, to applying network services to subscriber data traffic traversing computer networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile access networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical 3GPP mobile access network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs.

The increasing number and bandwidth requirements of services available to mobile devices pressures available mobile network resources. Policy and charging control (PCC) provides network operators with the means to manage service connections to ensure an efficient utilization of core, transport, and radio network resources. Different services, such as Internet, E-mail, voice, and multimedia, have different quality of service (QoS) requirements that, moreover, may vary by user. To manage service connections in a consistent manner for a mobile network that simultaneously carries multiple different services for multiple users, PCC provides a centralized control to determine an appropriate transport path for services, determine QoS requirements for the services, and determine resource allocation necessary to ensure QoS characteristics of transport paths sufficient to meet the QoS requirements for the various services. Service providers can introduce new differentiating value-added services by configuring per-subscriber policy rules that will personalize and tune virtual and physical services based on subscriber, device, location, and application.

SUMMARY

In general, techniques for managing services applied to groups of subscribers in a distributed service plane environment are described. The techniques may include creating groups of subscribers, redirecting the subscribers of a given group to a common service plane for the group, and enforcing group policies with respect to the group by the common service plane. In some examples, when a subscriber device associated with a subscriber attempts to access a network, a policy enforcement device may obtain a subscriber profile for the subscriber, the subscriber profile including a group policy having a group identifier that identifies a group of multiple subscribers, including the subscriber. The policy enforcement device may use the group identifier to assign the subscriber to a common service plane for the group, which applies the group policy to the subscriber data traffic for the subscriber as well as to other member subscribers of the group. By steering flows associated with a group of subscribers to a single common service plane and applying a group policy with the common service plane, the techniques may facilitate group service plans and/or reduce coordination activities within a distributed service plane environment that would otherwise be needed to apply a common service to the flows associated with the group of subscribers.

In one aspect, a method includes receiving, by a plurality of service planes and from a policy control server for a network, a policy enforcement request that includes data identifying a subscriber. The method also includes assigning, by the plurality of service planes in response to determining the subscriber is a member of a subscriber group that includes a plurality of subscribers, the subscriber to a selected service plane of the plurality of service planes. The method further includes applying, by the selected service plane, a group policy for the subscriber group to subscriber data traffic associated with the subscriber.

In another aspect, a policy enforcement device comprises a plurality of service planes each having one or more processors operably coupled to a memory, where the plurality of service planes are configured to receive, from a network access gateway for a network, a policy enforcement request that includes data identifying a subscriber. The plurality of service planes are further configured to assign, in response to determining the subscriber is a member of a subscriber group that includes a plurality of subscribers, the subscriber to a selected service plane of the plurality of service planes. In such examples, the selected service plane is configured to apply a group policy for the subscriber group to subscriber data traffic associated with the subscriber.

In another aspect, a non-transitory computer-readable storage medium comprises instructions that cause one or more processors of a policy enforcement device to receive, from a network access gateway for a network, a policy enforcement request that includes data identifying a subscriber and assign, in response to determining the subscriber is a member of a subscriber group that includes a plurality of subscribers, the subscriber to a selected service plane of the plurality of service planes. In such examples, the selected service plane is configured to apply a group policy for the subscriber group to subscriber data traffic associated with the subscriber.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
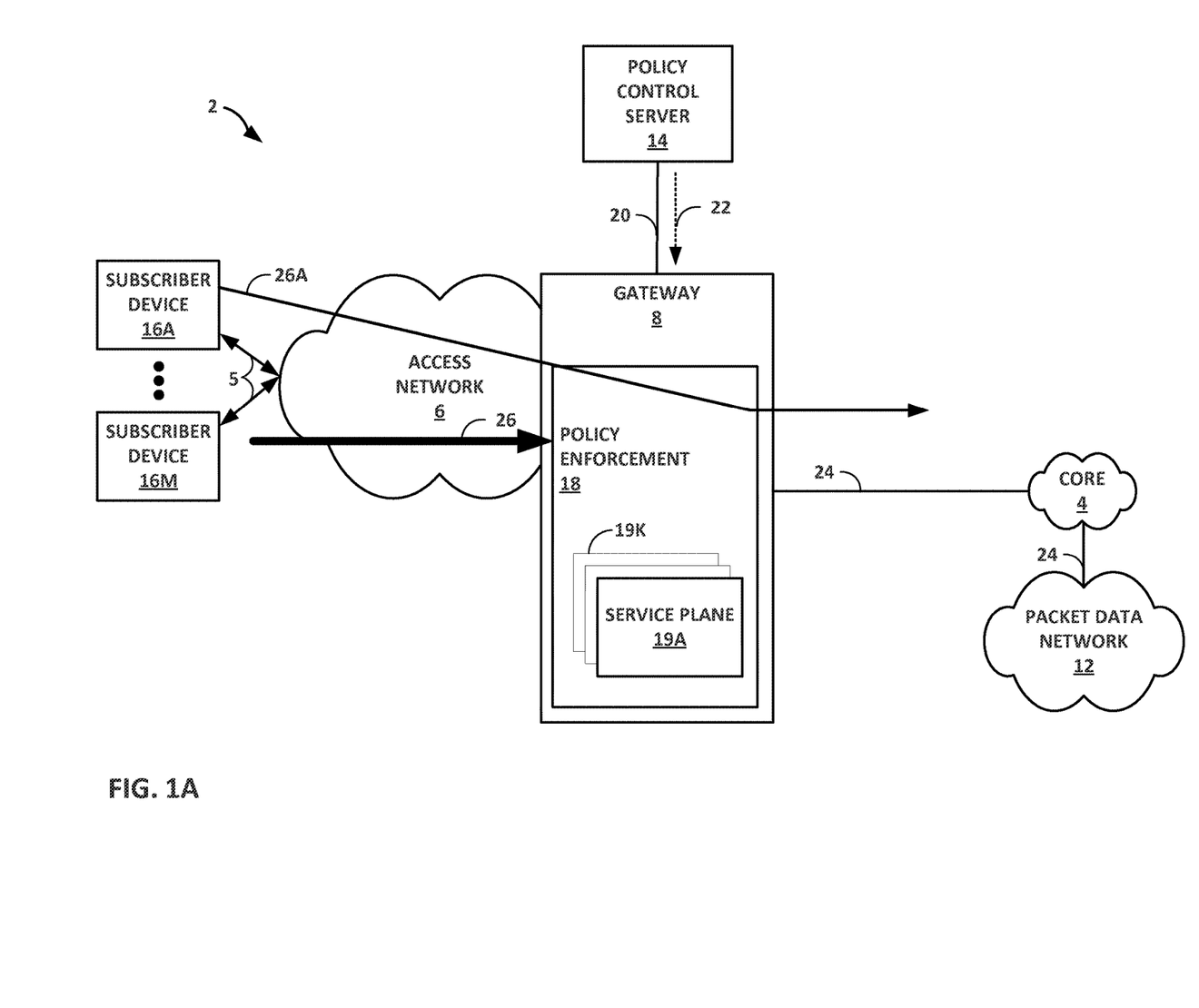
FIGS. 1A-1B are block diagrams illustrating an example network system that implements group policies, according to techniques described in this disclosure.
Figure 1B:
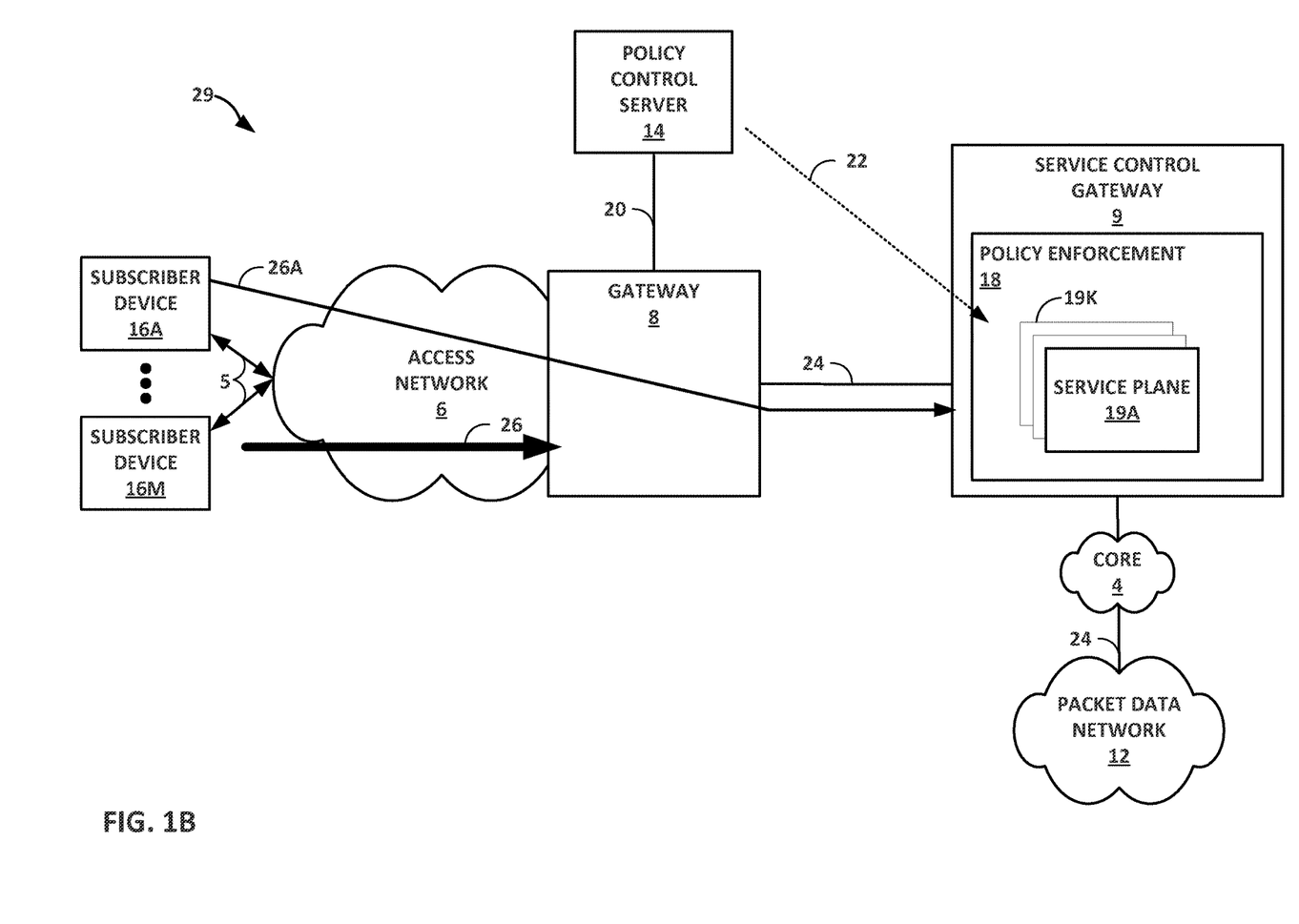

FIGS. 1A-1B are block diagrams each illustrating an example network system that applies group policies to subscribers according to techniques described herein. Network system 2 illustrated in FIG. 1A and network system 29 illustrated in FIG. 1B each includes packet data network (PDN) 12 coupled to service provider access network 6 ("access network 6") via access network gateway device 8 ("gateway 8") for access network 6. Packet data network 12 supports one or more packet-based services that are available for request and use by subscriber devices 16A-16M (collectively, "subscriber devices 16"). As examples, PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. Applications hosted by subscriber devices 16 may include VoIP clients, video games, videoconferencing, E-mail, and Internet browsers, among others. Each of subscriber devices 16 may represent, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services provided by PDN 12. A subscriber may represent, for instance, an enterprise, a residential subscriber, or a mobile subscriber. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from core network 4 (illustrated as "core 4" in FIGS. 1A-1B) of the service provider. Access network 6 includes network nodes (not shown) that execute communication protocols to transport control and user data to facilitate communication between subscriber devices 16 and gateway 8. Access network 6 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Any one or more of subscriber devices 16 may begin sending subscriber data traffic toward core network 4 in order to access and receive services provided by PDN 12, and such packets traverse gateway 8 as part of at least one packet flow. Flows 26 illustrated in FIGS. 1A-1B represent one or more upstream packet flows from any one or more subscriber devices 16 and directed to PDN 12. The term "packet flow," "traffic flow," or simply "flow" refers to a set of packets originating from a particular source device and sent to a particular destination device as part of a communication session between the source and destination device. Flows 26 in the aggregate may be referred to as "subscriber data traffic," although different subscriber devices 16 will have different associated subscriber data traffic. A flow of packets, in either the upstream (sourced by one of subscriber devices 16) or downstream (destined for one of subscriber devices 16) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Service provider core network 4 (hereinafter, "core network 4") offers packet-based connectivity to subscriber devices 16A-16M attached to access network 6 for accessing PDN 12. Core network 4 may represent a public network that is owned and operated by a service provider to interconnect a plurality of networks, which may include access network 6. Core network 4 may implement Multi-Protocol Label Switching (MPLS) forwarding and in such instances may be referred to as an MPLS network or MPLS backbone.

In some instances, core network 4 represents a plurality of interconnected autonomous systems, such as the Internet, that offers services from one or more service providers. PDN 12 may represent an edge network coupled to core network 4, e.g., by a customer edge device such as customer edge switch or router. PDN 12 may include a data center.

In examples of network systems 2, 29 that include a cellular access network as access network 6, gateway 8 may represent a mobile gateway, for example, a Gateway General Packet Radio Service (GPRS) Serving Node (GGSN), an Access Gateway (aGW), and/or a Packet Data Network (PDN) Gateway (PGW). In examples of network system 2 that include a wireline/broadband access network, gateway 8 may represent a Broadband Services Router (BSR), Broadband Network Gateway (BNG), business provider edge (PE) router, and/or a Broadband Remote Access Server (BRAS), for instance. Interface 24 may represent a Gi and/or SGi interface (or "reference point"). Consequently, elements of core network 4 may be referred to as an SGi-LAN and/or Gi-LAN.

In the example of network system 2 of FIG. 1A, gateway 8 is a network device that includes policy enforcement module 18 (illustrated as "policy enforcement 18") to perform policy enforcement for access network 6. In the example of network system 29 of FIG. 1B, service control gateway 9 is a network device that includes policy enforcement module 18 to perform policy enforcement for access network 6.

Service control gateway 9 of FIG. 1B operates as a gateway to anchor the delivery of dynamic service selection and application to packet flows. Service control gateway 9 may perform traffic detection, policy enforcement, and service steering according to techniques described herein. Service control gateway 9 may provide subscriber-aware, device-aware, and/or application-aware traffic detection and granular traffic steering functionality with policy interfaces. Service control gateway 9 may include integrated L4-L7 deep packet inspection (DPI), for instance. Service control gateway 9 may represent a physical gateway router or switch that connects virtual networks to physical networks such core network 4, the Internet, a customer VPN (e.g., L3VPN), another data center, or to non-virtualized servers. In some examples, service control gateway 9 represents a server, process, virtual machine, or controller executing within network system 29.

Policy enforcement module 18 performs policy enforcement in accordance with policy rules, such as policy and charging control (PCC) or application detection and control (ADC) rules, statically or dynamically provisioned in the policy enforcement module 18 of gateway 8 and service control gateway 9. In the dynamic case, policy control server 14 provisions policy enforcement module 18 by policy interface 20 with one or more policy rules that each specifies a set of information enabling the detection of a service data flow and defining policy control, charging, or application detection parameters. Policy control server 14 may represent, e.g., one or more computing devices that provide a Policy Control and Charging Rules Function (PCRF) for a mobile (e.g., 3GPP) or convergent instance of access network 6 or, alternatively or in addition, a network device that provides a Policy Decision Point (PDP) for a Broadband Policy Control Framework (BPCF) framework for a broadband/wireline instance of access network 6.

Policy interface 20 may represent a Gx and/or Sd interface/reference point. In some instances, the policy rules provided by policy control server 14 to gateway 8 include PCC rules and policy enforcement module 18 represents a Policy and Charging Enforcement Function (PCEF). In some instances, the policy rules may also or alternatively include Application Detection and Control (ADC) rules and policy enforcement module 18 represents a Traffic Detection Function (TDF). Any of a gateway 8, service control gateway 9, or a separate TDF device that includes the policy enforcement module 18 may be alternatively referred to herein as a "policy enforcement device." In some instances, policy enforcement module 18 may represent a Policy Decision Point for a BPCF framework. Further details regarding policy and charging controls are found in "3GPP TS 23.203—Policy and Charging Control Architecture (Release 13)," Version 13.4.0, 3rd Generation Partnership Project, Technical Specification Group Services and System Aspects, June 2015; and 3GPP TS 29.212—Policy and Charging Control (PCC), Reference Points (Release 13)," Version 13.2.0, June 2015; which are each incorporated herein by reference in their entirety.

Policy enforcement module 18 includes a distributed service plane environment in which a plurality of service planes 19A-19K (collectively, "service planes 19") each provides substantially independent policy enforcement to different subscriber data traffic. Policy enforcement module 18 enforces service flow-based policy and charging control according to the policy rules.

Each of service planes 19 represents one or more devices, service cards, modules, components, software libraries, virtual machines (e.g., virtual network functions (VNFs), or combination of the above that applies independent policy enforcement for access network 6 in accordance with static policy rules or with dynamic policy rules provided by policy control server 14. The techniques of this disclosure performed by policy enforcement module 18 may be performed by the network access gateway 8 or by the service control gateway 9 (or VNFs or other service nodes controlled by the service control gateway 9).

In some examples, service planes 19 each represent a different network device having a separate IP address or other network address on interface 24. For example, service planes 19 may each comprises a different TDF-IP device or a different PCEF-IP device. In some examples, service planes 19 each represent a different VNF managed and/or orchestrated by service control gateway 9 to provide substantially independent policy enforcement for access network 6. In some examples, service planes 19 each represent a different service card of a service control gateway 9 chassis or gateway 8 chassis to provide substantially independent policy enforcement for access network 6. The techniques of this disclosure are applicable to any combination of the above examples.

Policy control server 14 may include a database that includes information about subscribers, subscriber groups, and any functions or group policies to be applied to the subscribers. For instance, policy control server 14 may include a plurality of subscriber profiles, with each profile being associated with a particular subscriber. A "group" of subscribers may represent a family, an enterprise, or other collection of multiple subscribers each associated with a different one of subscriber devices 16.

In accordance with techniques of this disclosure, service planes 19 may be provisioned with group policies, with each group policy being applicable to data traffic for a group of multiple subscribers associated with subscriber devices 16. Policy enforcement module 18 directs flows 26 (and/or downstream flows) associated with subscribers of the group to a common service plane of service planes 19, and the common service plane 19 applies the group policy to the flows 26 associated the subscribers of the group.

For example, service plane 19A of policy enforcement module 18 may be provisioned with a group policy that includes one or more policy actions for common application to a group of flows 26 associated with multiple subscribers that are members of a group identified by the group policy. Policy enforcement module 18 directs the flows associated with any of the group of subscribers to the common service plane 19A for the group policy, which applies the group policy to the flows to perform a common service across the subscribers of the group.

A group policy for a group may include, e.g., usage monitoring in which the granted service units are shared among all subscribers of the group, rate limiting in which the rate (e.g., aggregate mean bit rate (AMBR)) is shared among all subscribers of the group, or other services that may be commonly applied to flows for a group of subscribers.

The techniques may provide one or more advantages. For example, by steering flows associated with a group of subscribers to a single common service plane and applying a group policy with the common service plane, the techniques may facilitate group service plans and/or reduce coordination activities within a distributed service plane environment that would otherwise be needed to apply a common service to the flows associated with the group of subscribers.

In some example implementations of the above techniques, a subscriber profile stored by policy control server 14 for a subscriber may include a group identifier that associates the subscriber with a particular subscriber group. Similarly, each group policy in policy control server 14 may also include a group identifier that identifies the group of subscribers to which the group policy is to be applied. As such, policy enforcement module 18 may be able to match the group identifier in the group policy with the group identifier in the subscriber profile. Policy enforcement module 18 can use these matched functions, group policies, and subscriber profiles to apply group policies to the subscriber data flows associated with subscribers that are members of the group.

The techniques may overcome certain limitations for network systems in which the policy control server 14 and/or policy enforcement module 18 assign subscribers to different TDF/PCEF devices, service cards, and/or VNFs irrespective of group membership. As described herein, for a group plan, each subscriber that is a member of the group receives a unique IP address for access network 6 and is anchored on a common service plane 19 (e.g., service card/TDF/PCEF/VNF). In order to provide a group-based policy to the group, policy control server 14 may direct flows 26 for subscribers that are members of the group to a single common service plane 19 in the form of a common network element (e.g., TDF/PCEF) and/or the same VNF/service card, such that the common service plane 19 may apply a common service (e.g., dynamic aggregate rate limiting) specified by the group policy. Policy control server 14 may further identify the group using a unique identifier, which can then push group policies each specifying a group identifier to which the group policy is to be applied. Policy enforcement module 18 may also identify the members of the group and apply combined service provisioning (e.g., rate limiting).

As noted above, policy control server 14 may be configured with groups, each group representing multiple subscribers that are members of the group. For example, when a corporation registers for a group plan, the operator will create a unique group identifier for the corporation and provisions the same in the home subscriber server (HSS) and/or policy control server 14. This unique identifier can be a simple number or a combination of unique identifiers.

Policy control server 14 may receive requests from subscribers to join the plan. When a subscriber registers to the group, the subscriber profile in policy control server 14 is provisioned by the policy control server 14 with the group policy created earlier.

In some example implementations, policy enforcement module 18 directs flows 26 to a common service plane 19 for a group of subscribers using a traffic detection function (TDF) redirection process in a distributed TDF environment. When a subscriber device 16A attaches to gateway 8 for network services using an access request that identifies the subscriber device 16A, gateway 8 may generate and send to policy control server 14 an accounting request to request a TDF for the subscriber device 16A. The TDF and a serving TDF may be represented by any of service planes 19 in FIGS. 1A-1B. The access request may include an International Mobile Subscriber Identity (IMSI), an International Mobile Equipment Identity (IMEI), a username, or other subscriber identification data that identifies the subscriber associated with subscriber device 16A.

The TDF that receives the flows for the subscriber device 16A may direct the flows in accordance with a local policy or a policy obtained from policy control server 14 for the identified subscriber. In any case, the policy is extended to include a group identifier and an identifier (such as an IP address) for a serving TDF that performs policy enforcement for subscriber devices that are members of the group identified by the group identifier.

If the policy is a dynamic policy (e.g., a dynamic PCC/ADC rule) obtained from policy control server 14 in a policy installation message 22, the TDF parses the policy to determine the identifier for the serving TDF. In the case of a static policy, policy control server 14 may configure the serving TDF in the subscriber selection profile. If the serving TDF is different than the TDF (i.e., is not local), then the TDF forwards the accounting request to the serving TDF. Although described with respect to a TDF, the techniques described above are similarly applicable to PCEF redirection.

Individual service planes 19 may enforce rate limiting across the subscribers of a group in several ways. In one example, a service plane 19 may use logical interface (IFL) subscriber features and map all subscribers to the same IFL. In another example, a service plane 19 may implement an aggregate mean bitrate (AMBR) feature and use a single policer token for all of the subscribers of the group. In various instances, the policer token may define a threshold AMBR for a subscriber group. In such instances, if the bitrate of the media stream sent by subscriber device 16A, e.g., exceeds the threshold AMBR, or the additional bitrate added to the AMBR causes the subscriber group's AMBR to exceed the threshold AMBR, the selected service plane 19 may drop data packets from the subscriber data traffic until the AMBR of the subscriber group no longer exceeds the threshold AMBR defined by the policer token.

By assigning each subscriber in a subscriber group to the same, common service plane 19 and applying, by the common service plane 19, a group policy with respect to flows associated with subscribers of the subscriber group, a common service (e.g., AMBR) for the subscriber group can be more easily monitored. Rather than communicating across different service planes 19, which may require additional coordination, processing power, battery power, and processing time, placing each subscriber of a subscriber group in the same service plane 19 allows the policy enforcement device to efficiently and effectively monitor any group policy defined by the policer tokens. For instance, a selected service plane 19 can identify subscribers of the group and apply combined service provisioning, such as rate limiting, rather than multiple service planes attempting to coordinate by to enforce the group policies across multiple service planes.

As noted above and in some examples, service control gateway 9 implements a traffic detection function (TDF) to perform application traffic detection and reporting of detected applications' traffic along with a TDF application instance identifier and service data flow descriptions to a PCRF (which may represent an example of policy control server 14) when the service data flow descriptions are deducible. Like a PCEF, the TDF receives rules from the PCRF, known as Application Detection and Control (ADC) rules, which the PCRF may provide and activate by a subscriber device reference point. In addition, according to techniques of the current disclosure, an ADC rule may include a group identifier. As such, policy enforcement module 18 may determine which TDF to apply to subscriber device 16A and other subscriber devices of the group that includes subscriber device 16A. The TDF applies, to detected application traffic, enforcement actions such as gating, redirection, and bandwidth limiting to application traffic associated with subscribers of the subscriber group with the same group identifier as the TDF itself.

The PCRF may install the extended ADC rule to the TDF with a matching group identifier using an ADC installation message, e.g., policy installation message 22. The ADC installation message may represent an ADC-Rule-Install AVP, for instance. Upon receiving the extended ADC rule included in the ADC installation messages, the TDF applies the extended ADC rule to flows received for subscriber device 16A.

Figure 2:
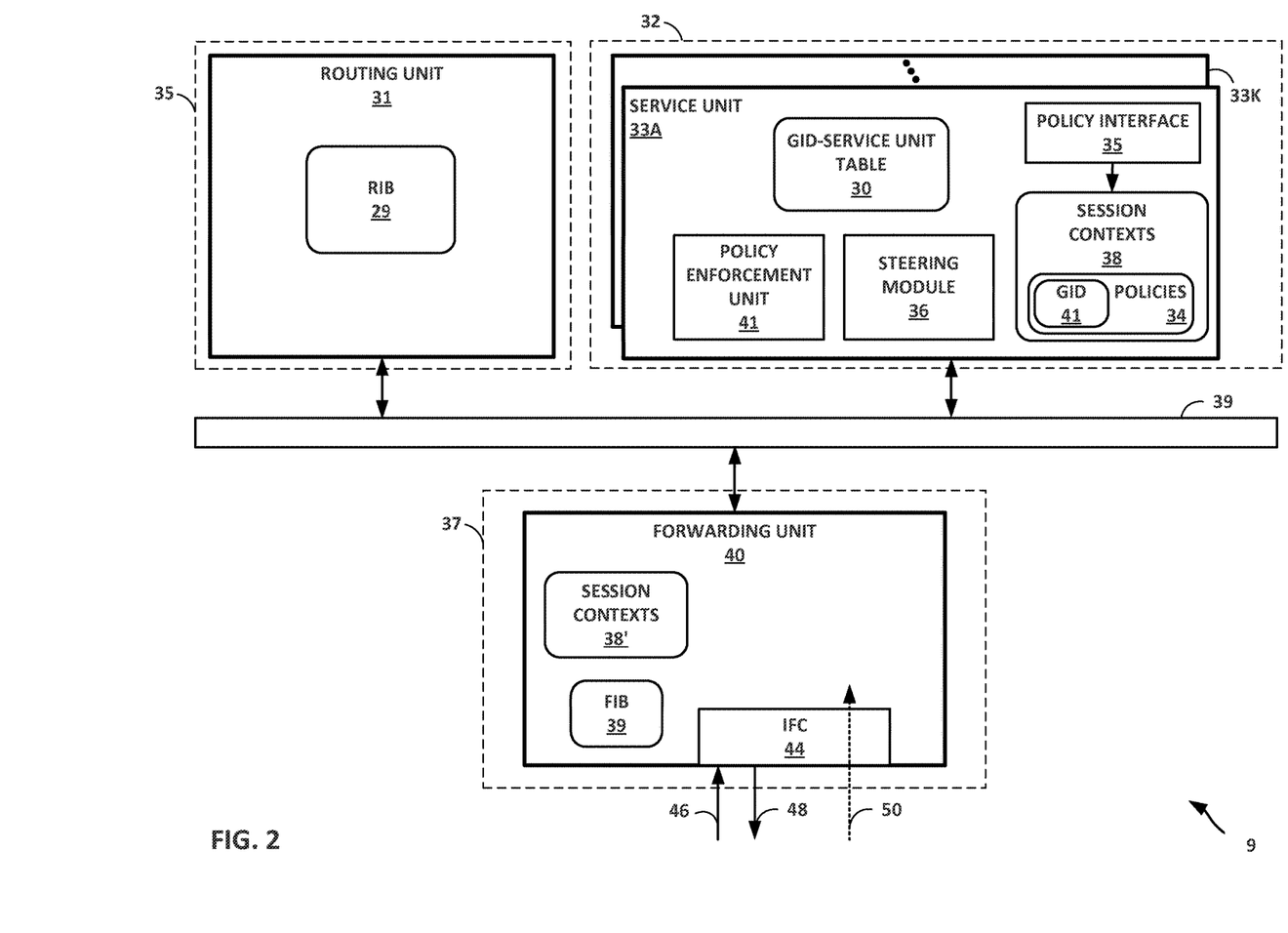
FIG. 2 is a block diagram illustrating, in further detail, an example instance of the gateway of FIG. 1 that requests policy enforcement procedures to be implemented, according to techniques described herein.

FIG. 2 is a block diagram illustrating, in further detail, an example embodiment of the service control gateway of FIG. 1B that enforces group policies according to techniques described herein. Although FIG. 2 is illustrated with respect to an example of service control gateway 9 device that includes multiple service cards 33A-33K as substantially independently operating service planes, the techniques described with respect to other architectures that implement distributed service plane, such as distributed VNFs, multiple distributed TDF/PCEF devices, or a combination of the above.

In this example, service control gateway 9 is divided into three logical or physical "planes" to include a routing plane 35, a distributed service plane 32, and a "data" or "forwarding" plane 37. That is, service control gateway 9 implements three separate functionalities, e.g., the routing/control, service, and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Service plane 32 is a decentralized service plane in that service plane functionality is distributed among a plurality of service units 33A-33K ("service units 33"). Each of routing unit 31, subscriber management service units 33, and forwarding unit 40 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 31, service units 33, and forwarding unit 40 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 39 couples routing unit 31, service units 33, and forwarding unit 40 to deliver data units and control messages among the units. Switch 39 may represent an internal switch fabric or cross-bar, bus, or link. Examples of high-speed multi-stage switch fabrics used as a forwarding plane to relay packets between units within a router are described in U.S. Patent Application 2008/0044181, entitled MULTI-CHASSIS ROUTER WITH MULTIPLEXED OPTICAL INTERCONNECTS. The entire contents of U.S. Patent Application 2008/0044181 are incorporated herein by reference.

Routing unit 31 executes the routing functionality of service control gateway 9. In this respect, routing unit 31 represents hardware or a combination of hardware and software of control that implements routing protocols (not shown in FIG. 2) by which routing information stored in a routing information base 29 ("RIB 29") may be determined. RIB 29 may include information defining a topology of a network, such as access network 6 of FIG. 1. Routing unit 31 may resolve the topology defined by routing information in RIB 29 to select or determine one or more routes through the network. Routing unit 31 may then update data plane 37 with these routes, where forwarding unit 40 of data plane 37 store these routes as respective forwarding information base 39 ("FIB 39"). Further details of one example embodiment of a router can be found in U.S. patent application Ser. No. 12/182,619, filed July 30, and entitled "STREAMLINED PACKET FORWARDING USING DYNAMIC FILTERS FOR ROUTING AND SECURITY IN A SHARED FORWARDING PLANE," which is incorporated herein by reference.

Data plane (alternatively, "forwarding plane") 37 represents hardware or a combination of hardware and software that forward network traffic in accordance with forwarding information. In the example of service control gateway 9 of FIG. 2, data plane 37 includes forwarding unit 40 that provides high-speed forwarding of network traffic received by interface card ("IFC 44") via inbound link 46 to outbound link 48. Forwarding unit 40 may comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a service control gateway 9 chassis or combination of chassis.

Service units 33 may each represent, for example, a packet forwarding engine (PFE) or a component of physical interface card insertable within a chassis of service control gateway 9. The physical interface card may be, for instance, a multi-services dense port concentrator (MS-DPC). Subscriber management service units 33 may also each represent a co-processor executing on a routing node, such as routing unit 31. Service units 33 may be alternatively referred to as "service PICs" or "service cards." Each of service units 33 includes substantially similar components to perform substantially similar functionality, said components and functionality being described hereinafter with respect to service unit 33A.

Service unit 33A applies services to flows associated with subscribers of an access network serviced by the service control gateway. Such services may include firewall, carrier grade network address translation (CG-NAT), performance enhancement proxies for video, transport control protocol (TCP) optimization and header enrichment, caching, and load balancing. In addition, policy enforcement unit 41 executed by service unit 33A performs policy enforcement for subscriber sessions anchored to service unit 33A and in accordance with policies 34 for the subscriber sessions. Policy enforcement may include AMBR and usage monitoring, for example.

In the illustrated example, IFC card 44 receives policy enforcement request 50, e.g., from a policy control server 14, on inbound interface 46 and forwards the policy enforcement request to service unit 33A. Policy enforcement request 50 may represent a TDF session request, a PCEF session request, a policy rule installation message, or other request for policy enforcement with respect to a session for one or more flows received by service control gateway 9. Policy enforcement request 50 may include data identifying subscriber device 16A.

Each subscriber session (e.g., an IP-CAN session) has an associated session context 38 that includes data specifying services, forwarding information, and so forth, that service unit 33A uses to process flows for the subscriber session. Such data includes policies 34.

According to techniques of this disclosure, a policy of policies 34 may include a group identifier 41 that identifies the policy as a group policy to be applied in common to flows associated with multiple subscribers. Accordingly, service control gateway 9 may assign each subscriber of a subscriber group to the same service unit of service units 33 for the purpose of applying a group policy that identifies the subscriber group. In some example implementations, steering module 36 executed by service unit 33A may receive the policy enforcement request 50 for a subscriber device 16A and, based on policies 34 and group identifier ("GID") 41, determine the subscriber group of which subscriber device 16A is a member. Policy interface 35 may obtain, from a policy control server 14, a subscriber profile associated with subscriber device 16A.

Service unit 33A includes a local GID-service unit table 30 that includes entries that each map a group identifier to one of service units 33. If GID-service unit table 30 includes an entry for the GID 41 value for a group policy 34 for the subscriber device 16A, steering module 36 directs policy enforcement request 50 to the selected service unit 33 mapped to the GID 41 value. The selected service unit 33 may receive the policy enforcement request 50, create a service session (e.g., a TDF/PCEF session) with a session context 38, and apply the group policies 34 to the flows associated with the subscriber device 16A. As a result, any subscriber device 16 for which service control gateway 9 receives a policy enforcement request and that is a member of a particular group is assigned by the service control gateway 9 to a common service unit 33 for application of a group policy for the group. The techniques may thus enable group-based policies and/or reduce inter-service unit 33 communications for group-based policy coordination.

In some examples, the group policy includes a group identifier that uniquely identifies the plurality of subscribers within a policy domain served by a policy server that controls the policy enforcement device. The group identifier for the group policy may match the group identifier in the subscriber profile. By matching the group identifier for the group policy to the group identifier in the subscriber profile for each subscriber in the subscriber group, a service card may efficiently retrieve the group policies to be implemented for each subscriber in the subscriber group.

Figure 3:
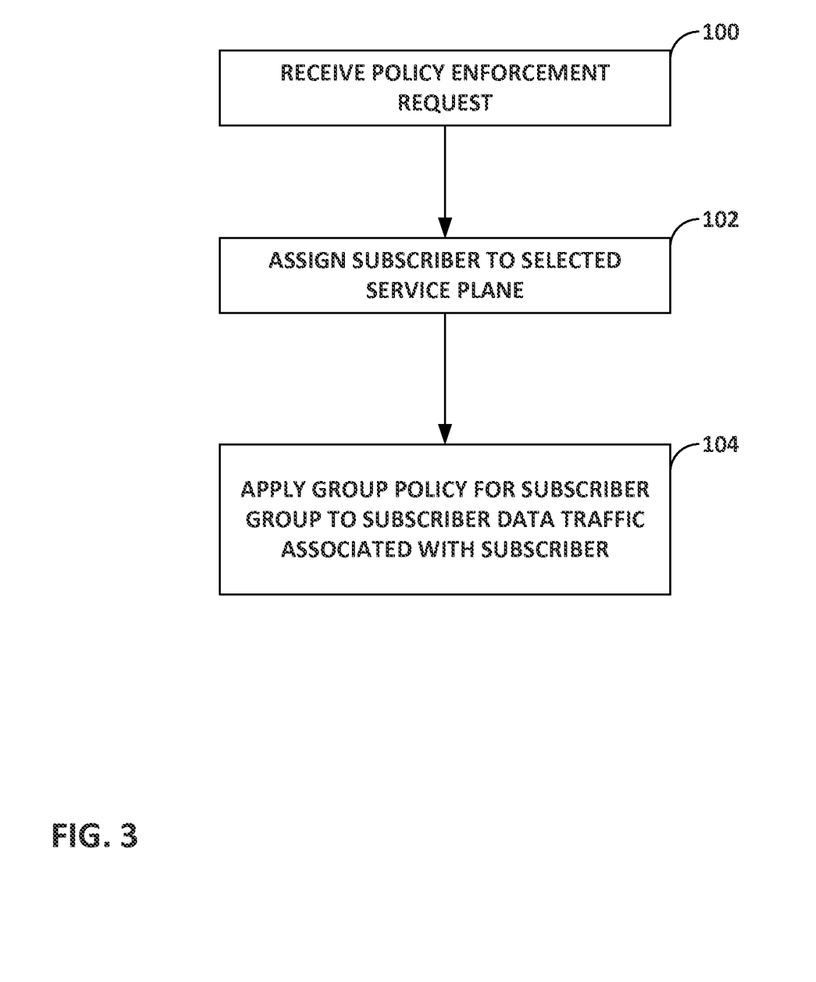
FIG. 3 is a flowchart illustrating an example mode of operation for a policy enforcement device that applies policy rules according to techniques described in this disclosure.

FIG. 3 is a flowchart illustrating an example mode of operation for a policy enforcement device that applies policy rules according to techniques described in this disclosure. For the purposes of this example, reference will be made to devices and structures of FIG. 1. In accordance with techniques of this disclosure, a policy enforcement device (e.g., policy enforcement module 18) may receive a policy enforcement request that includes data identifying a subscriber device (e.g., subscriber device 16A) from a gateway (e.g., network access gateway 8) for a network (e.g., network 6) (100). For instance, subscriber device 16A may be a laptop computing device attempting to conduct a videoconference over network 6 using network access gateway 8. In such an example, subscriber device 16A may send a request to access network 6 for the purpose of sending and receiving a media stream associated with the videoconference. Upon receiving this request, network access gateway 8 may send a policy enforcement request to policy enforcement module 18.

Policy enforcement module 18 may include a plurality of service planes. Each service plane may direct packets arriving on an inbound interface. For instance, service planes can make forwarding or processing decisions based on higher-layer information, such as a Web URL contained in the packet payload.

Techniques of this disclosure include assigning each subscriber of a subscriber group to the same service plane for the purpose of applying group policies. In order to do so, policy enforcement module 18 may determine the subscriber group to which subscriber 16A belongs. As such, upon receiving an accounting request, policy enforcement module 18 may retrieve a subscriber profile associated with subscriber device 16A from policy server 14. Information in the subscriber profile may include a group identifier. Based at least in part on the information in the subscriber profile, policy enforcement module 18 may determine the group identifier associated with subscriber device 16A. Policy enforcement module 18 may then determine the subscriber group with a group identifier that matches the group identifier retrieved from the subscriber profile in a policy server (e.g., policy server 14).

In response to determining subscriber 16A is a member of a subscriber group that includes a plurality of subscribers, policy enforcement module 18 may assign subscriber 16A to a selected service plane of the plurality of service planes (102). As described above, policy enforcement module 18 may use group identifiers to determine the subscriber group with which subscriber device 16A is associated with. Similar group identifiers may be associated with a particular service plane. In other words, each service plane may include one or more group identifiers to which the service plane caters. Further, each group identifier is associated with a single service plane. In response to determining that subscriber 16A belongs to the subscriber group that includes subscriber devices 16A-16D, policy enforcement module 18 may assign subscriber 16A to the corresponding service plane.

In some examples, each service plane of the plurality of service planes may be executed by a different service card of policy enforcement device 18. The service card may be a network interface card, a network adapter, a LAN adapter, a physical network interface, or any other computer hardware component that interacts with subscriber device 16A and network 6. As each service plane is executed by a different service card, if subscribers in the same group were interacting with network 6 over different service cards, it would be necessary for gateway 8 to facilitate hardware intercommunications to enforce group policies between service cards. By assigning each subscriber in a subscriber group to the same service card, these hardware intercommunications are eliminated for the purpose of implementing a group policy for the subscriber group.

After being assigned subscriber 16A, the selected service plane may apply a group policy for the subscriber group to subscriber data traffic associated with subscriber 16A (104). For instance, for the subscriber group that includes subscriber devices 16A-16M, a certain group policy defined by a policer token may indicate that a device may only send a video at a certain framerate or with a certain definition level. As such, the selected service plane may apply the group policy to subscriber 16A, which is attempting to conduct a video conference. For example, if the group policy indicates that a subscriber may only send a video at a framerate of 10 frames per second, the selected service plane may limit the subscriber data traffic associated with the videoconference sent over network 6 such that the videoconference has a framerate of, at most, 10 frames per second, by dropping data packets from the stream. In various instances, the policer token may define a threshold AMBR for the subscriber group. In such instances, if the bitrate of the media stream sent by subscriber device 16A exceeds the threshold AMBR, or the additional bitrate added to the AMBR causes the subscriber group's AMBR to exceed the threshold AMBR, the selected service plane may drop data packets from the subscriber data traffic until the AMBR of the subscriber group no longer exceeds the threshold AMBR defined by the policer token. In some instances, the group policy may specify a collective service shared by each of the subscribers in the subscriber group. In such instances, the selected service plane may apply the collective service to subscriber data traffic associated with any of the plurality of subscribers.

In some examples, the group policy includes a group identifier that uniquely identifies the plurality of subscribers within a policy domain served by a policy server that controls the policy enforcement device. The group identifier for the group policy may match the group identifier in the subscriber profile. By matching the group identifier for the group policy to the group identifier in the subscriber profile for each subscriber in the subscriber group, a service card may efficiently retrieve the group policies to be implemented for each subscriber in the subscriber group.

By assigning each subscriber in a subscriber group to the same service plane and applying a group policy across the service plane, an AMBR for the subscriber group can be more easily monitored. Rather than communicating across service planes, which requires additional processing power, battery power, and processing time, placing each subscriber of a subscriber group in the same service plane allows the policy enforcement device to efficiently and effectively monitor any group policy defined by the policer tokens. The service planes can execute the TDF to identify subscribers of the group and apply combined service provisioning, such as rate limiting, rather than the gateway receiving this information from a multitude of service planes, combining this information, and attempting to enforce the group policies across multiple service planes.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the disclosure have been described. Any combination of the described systems, operations, or functions is contemplated. These and other examples are within the scope of the following claims.

What is claimed is:

1. A method comprising:
    receiving, by a network gateway comprising a plurality of service planes, and from a policy control server for a network, a first policy enforcement request that includes data identifying a first subscriber;
    obtaining, by the network gateway and from the policy control server, a group policy for the first subscriber, wherein the group policy for the first subscriber comprises a first unique group identifier that identifies a first subscriber group of one or more subscribers including the first subscriber;

assigning, by the network gateway and based at least in part on the first unique group identifier of the group policy for the first subscriber, the first subscriber to a selected service plane of the plurality of service planes that applies the group policy for the first subscriber group;

creating, by the selected service plane and based on the assigning of the first subscriber to the selected service plane, a first session context for the first subscriber, the first session context including the group policy for the first subscriber;

storing, by the network gateway and based on the assigning of the first subscriber to the selected service plane, a mapping of the first unique group identifier to the selected service plane;

applying, by the selected service plane, the group policy for the first subscriber to subscriber data traffic associated with the first subscriber;

receiving, by the network gateway, and from the policy control server, a second policy enforcement request that includes data identifying a second subscriber different than the first subscriber;

obtaining, by the network gateway and from the policy control server, a group policy for the second subscriber, wherein the first subscriber group of one or more subscribers further includes the second subscriber, wherein the group policy for the second subscriber comprises the first unique group identifier that identifies the first subscriber group of one or more subscribers;

assigning, by the network gateway and based at least in part on the first unique group identifier of the group policy for the second subscriber and the mapping of the first unique group identifier to the selected service plane, the second subscriber to the selected service plane of the plurality of service planes, to which the first subscriber is also assigned;

creating, by the selected service plane and based on the assigning of the second subscriber to the selected service plane, a second session context for the second subscriber, the second session context including the group policy for the second subscriber; and applying, by the selected service plane, the group policy for the second subscriber to subscriber data traffic associated with the second subscriber.

2. The method of claim 1, wherein each service plane of the plurality of service planes is executed by a different service card of a policy enforcement device.

3. The method of claim 2, wherein the policy enforcement device comprises one of a Traffic Detection Function device and a Policy and Charging Enforcement Function device.

4. The method of claim 1, wherein each service plane of the plurality of service planes is a virtual network function.

5. The method of claim 1, wherein applying the group policy for the first subscriber comprises applying, by the selected service plane, the group policy that has a group identifier that matches the first unique group identifier of the first subscriber group to which the first subscriber belongs.

6. The method of claim 1, wherein the group policy specifies a collective service shared by each of the plurality of subscribers, the method further comprising:

applying the collective service to subscriber data traffic associated with any of the plurality of subscribers.

7. A policy enforcement device comprising:
a plurality of service planes each having one or more processors operably coupled to a memory, wherein a first service plane of the plurality of service planes is configured to:
receive, from a policy control server for a network, a first policy enforcement request that includes data identifying a first subscriber,
obtain, from the policy control server, a group policy for the first subscriber, wherein the group policy for the first subscriber comprises a first unique group identifier that identifies a first subscriber group of one or more subscribers including the first subscriber,
assign, based at least in part on the first unique group identifier of the group policy for the first subscriber, the first subscriber to a selected service plane of the plurality of service planes that applies the group policy for the first subscriber group,
create, by the selected service plane and based on the assigning of the first subscriber to the selected service plane, a first session context for the first subscriber, the first session context including the group policy for the first subscriber,
store, based on the assigning of the first subscriber to the selected service plane, a mapping of the first unique group identifier to the selected service plane,
receive, from the policy control server, a second policy enforcement request that includes data identifying a second subscriber different than the first subscriber,
obtain, from the policy control server, a group policy for the second subscriber, wherein the first subscriber group of one or more subscribers further includes the second subscriber, wherein the group policy for the second subscriber comprises the first unique group identifier that identifies the first subscriber group of one or more subscribers,
assign, based at least in part on the first unique group identifier of the group policy for the second subscriber and the mapping of the first unique group identifier to the selected service plane, the second subscriber to the selected service plane of the plurality of service planes, to which the first subscriber is also assigned, and
create, by the selected service plane and based on the assigning of the second subscriber to the selected service plane, a second session context for the second subscriber, the second session context including the group policy for the second subscriber,
wherein the selected service plane is configured to apply the group policy for the first subscriber and the second subscriber to subscriber data traffic associated with the first subscriber and the second subscriber, respectively.

8. The policy enforcement device of claim 7, further comprising a plurality of service cards, wherein each service plane of the plurality of service planes is executed by a different service card of the plurality of service cards of the policy enforcement device.

9. The policy enforcement device of claim 7, wherein the selected service plane being configured to apply the group policy for the first subscriber comprises the selected service plane being configured to apply the group policy that has a group identifier that matches the first unique group identifier of the first subscriber group to which the first subscriber belongs.

10. The policy enforcement device of claim 7, wherein the group policy specifies a collective service shared by each of the plurality of subscribers, and wherein the plurality of service planes are further configured to:

apply the collective service to subscriber data traffic associated with any of the plurality of subscribers.

11. A non-transitory computer-readable storage medium comprising instructions that cause one or more processors of a policy enforcement device comprising a plurality of service planes to:

receive, from a network access gateway for a network, a first policy enforcement request that includes data identifying a first subscriber;

obtain, from the policy control server, a group policy for the first subscriber, wherein the group policy for the first subscriber comprises a first unique group identifier that identifies a subscriber group of one or more subscribers including the subscriber; assign, based at least in part on the first unique group identifier of the group policy for the first subscriber, the subscriber to a selected service plane of the plurality of service planes that applies the group policy for the first subscriber group;

create, by the selected service plane and based on the assigning of the first subscriber to the selected service plane, a first session context for the first subscriber, the first session context including the group policy for the first subscriber;

store, based on the assigning of the first subscriber to the selected service plane, a mapping of the first unique group identifier to the selected service plane;

receive, from the policy control server, a second policy enforcement request that includes data identifying a second subscriber different than the first subscriber;

obtain, from the policy control server, a group policy for the second subscriber, wherein the first subscriber group of one or more subscribers further includes the second subscriber, wherein the group policy for the second subscriber comprises the first unique group identifier that identifies the first subscriber group of one or more subscribers; assign, based at least in part on the first unique group identifier of the group policy for the second subscriber, the second subscriber to the selected service plane of the plurality of service planes, to which the first subscriber is also assigned; and create, by the selected service plane and based on the assigning of the second subscriber to the selected service plane, a second session context for the second subscriber, the second session context including the group policy for the second subscriber, wherein the selected service plane is configured to apply the group policy for the first subscriber and the second subscriber to subscriber data traffic associated with the first subscriber and the second subscriber, respectively.

12. The non-transitory computer-readable storage medium of claim 11, wherein each service plane of the plurality of service planes is executed by a different service card of a plurality of service cards of the policy enforcement device.

* * * * *